US006593267B2

(12) United States Patent
Kuo et al.

(10) Patent No.: US 6,593,267 B2
(45) Date of Patent: Jul. 15, 2003

(54) METHOD FOR PREPARING A SUPPORTED CATALYST SYSTEM AND ITS USE IN A POLYMERIZATION PROCESS

(75) Inventors: Chi-I Kuo, Humble, TX (US); Agapios K. Agapiou, Humble, TX (US); Steven K. Ackerman, Baytown, TX (US); Simon X. Zhang, Houston, TX (US)

(73) Assignee: Univation Technologies, LLC, Houston, TX (US)

( * ) Notice: Subject to any disclaimer, the term of this patent is extended or adjusted under 35 U.S.C. 154(b) by 5 days.

(21) Appl. No.: 10/000,683

(22) Filed: Oct. 31, 2001

(65) Prior Publication Data

US 2002/0161145 A1 Oct. 31, 2002

Related U.S. Application Data

(60) Provisional application No. 60/256,292, filed on Dec. 18, 2000.

(51) Int. Cl.$^7$ .................................................. C08F 4/64
(52) U.S. Cl. .................... 502/107; 502/152; 502/170; 526/154; 526/158; 526/170
(58) Field of Search ................... 502/107, 152, 502/170; 526/154, 158, 170

(56) References Cited

U.S. PATENT DOCUMENTS

| | | | |
|---|---|---|---|
| 3,082,198 A | 3/1963 | Klein | 260/94.9 |
| 3,919,185 A | 11/1975 | Takebe et al. | 260/93.7 |
| 4,012,574 A | 3/1977 | Jones et al. | 526/74 |
| 4,532,311 A | 7/1985 | Fulks et al. | 526/62 |
| 4,792,592 A | 12/1988 | Fulks et al. | 526/62 |
| 4,803,251 A | 2/1989 | Goode et al. | 526/59 |
| 4,855,370 A | 8/1989 | Chirillo et al. | 526/74 |
| 4,876,320 A | 10/1989 | Fulks et al. | 526/62 |
| 5,026,795 A | 6/1991 | Hogan | 526/74 |
| 5,034,480 A | 7/1991 | Funk et al. | 526/74 |
| 5,034,481 A | 7/1991 | Funk et al. | 526/74 |
| 5,066,736 A | 11/1991 | Dumain et al. | 526/82 |
| 5,126,414 A | 6/1992 | Cooke et al. | 526/68 |
| 5,283,278 A | 2/1994 | Daire et al. | 524/399 |
| 5,332,706 A | 7/1994 | Nowlin et al. | 502/107 |
| 5,391,657 A | 2/1995 | Song et al. | 526/74 |
| 5,410,002 A | 4/1995 | Govoni et al. | 526/88 |
| 5,427,991 A | 6/1995 | Turner | 502/103 |
| 5,461,123 A | 10/1995 | Song et al. | 526/74 |
| 5,473,028 A | 12/1995 | Nowlin et al. | 526/114 |
| 5,492,975 A | 2/1996 | Peifer et al. | 525/274 |
| 5,610,244 A | 3/1997 | Govoni et al. | 526/65 |
| 5,627,243 A | 5/1997 | Hämäläinen et al. | 526/68 |
| 5,643,847 A | 7/1997 | Walzer, Jr. | 502/117 |
| 5,661,095 A | 8/1997 | Meverden et al. | 502/102 |
| 6,300,436 B1 | 10/2001 | Agapiou et al. | 526/154 |
| 6,306,984 B1 | 10/2001 | Agapiou et al. | 526/154 |

FOREIGN PATENT DOCUMENTS

| | | |
|---|---|---|
| EP | 0 453 116 A1 | 10/1991 |
| EP | 0 549 252 A1 | 6/1993 |
| EP | 0 811 638 A2 | 12/1997 |
| WO | WO 96/08520 | 3/1996 |
| WO | WO 96/11961 | 4/1996 |
| WO | WO 97/06186 | 2/1997 |
| WO | WO 97/14721 | 4/1997 |
| WO | WO 97/15602 | 5/1997 |
| WO | WO 97/27224 | 7/1997 |
| WO | WO 97/46599 | 12/1997 |

*Primary Examiner*—Caixia Lu
(74) *Attorney, Agent, or Firm*—Lisa Kimes Jones; Kevin M. Faulkner

(57) ABSTRACT

The present invention relates to a composition of a carboxylate metal salt in combination with a heated polymerization catalyst to improve the flowability and operability of the catalyst. The invention also relates to methods for preparing the catalyst composition and to its use in a polymerization process.

11 Claims, No Drawings

METHOD FOR PREPARING A SUPPORTED CATALYST SYSTEM AND ITS USE IN A POLYMERIZATION PROCESS

This application claims the benefit of Provisional application Ser. No. 60/256,292, filed Dec. 18, 2000.

FIELD OF THE INVENTION

The present invention relates to a method for preparing a supported catalyst system and for its use in a process for polymerizing olefin(s). In particular, the invention is directed to the use of a carboxylate metal salt that has improved flowability. Specifically, the invention relates to a method for preparing a supported catalyst system, especially a bulky ligand metallocene catalyst system, including a carboxylate metal salt that has an improved flowability.

BACKGROUND OF THE INVENTION

Advances in polymerization and catalysis have resulted in the capability to produce many new polymers having improved physical and chemical properties useful in a wide variety of superior products and applications. With the development of new catalysts the choice of polymerization type (solution, slurry, high pressure or gas phase) for producing a particular polymer has been greatly expanded. Also, advances in polymerization technology have provided more efficient, highly productive and economically enhanced processes. Especially illustrative of these advances is the development of technology utilizing bulky ligand metallocene catalyst systems or single site catalyst systems. In particular, in a slurry or gas phase process, where typically a supported catalyst system is used, there are a variety of different methods described in the art for supporting bulky ligand metallocene catalyst systems. Regardless of these technological advances in the polyolefin industry, common problems, as well as new challenges associated with process operability still exist. For example, the tendency for a gas phase or slurry phase process to foul and/or sheet remains a challenge.

Evidence of, and solutions to, various process operability problems have been addressed by many in the art. For example, U.S. Pat. Nos. 4,792,592, 4,803,251, 4,855,370 and 5,391,657 all discuss techniques for reducing static generation in a polymerization process by introducing to the process for example, water, alcohols, ketones, and/or inorganic chemical additives; PCT publication WO 97/14721 published Apr. 24, 1997 discusses the suppression of fines that can cause sheeting by adding an inert hydrocarbon to the reactor; U.S. Pat. No. 5,627,243 discusses a new type of distributor plate for use in fluidized bed gas phase reactors; PCT publication WO 96/08520 discusses avoiding the introduction of a scavenger into the reactor; U.S. Pat. No. 5,461,123 discusses using sound waves to reduce sheeting; U.S. Pat. No. 5,066,736 and EP-A1 0 549 252 discuss the introduction of an activity retarder to the reactor to reduce agglomerates; U.S. Pat. No. 5,610,244 relates to feeding make-up monomer directly into the reactor above the bed to avoid fouling and improve polymer quality; U.S. Pat. No. 5,126,414 discusses including an oligomer removal system for reducing distributor plate fouling and providing for polymers free of gels; EP-A1 0 453 116 published Oct. 23, 1991 discusses the introduction of antistatic agents to the reactor for reducing the amount of sheets and agglomerates; U.S. Pat. No. 4,012,574 discusses adding a surface-active compound, a perfluorocarbon group, to the reactor to reduce fouling; U.S. Pat. No. 5,026,795 discusses the addition of an antistatic agent with a liquid carrier to the polymerization zone in the reactor; U.S. Pat. No. 5,410,002 discusses using a conventional Ziegler-Natta titanium/magnesium supported catalyst system where a selection of antistatic agents are added directly to the reactor to reduce fouling; U.S. Pat. Nos. 5,034,480 and 5,034,481 discuss a reaction product of a conventional Ziegler-Natta titanium catalyst with an antistat to produce ultrahigh molecular weight ethylene polymers; U.S. Pat. No. 3,082,198 discusses introducing an amount of a carboxylic acid dependent on the quantity of water in a process for polymerizing ethylene using a titanium/aluminum organometallic catalysts in a hydrocarbon liquid medium; and U.S. Pat. No. 3,919,185 describes a slurry process using a nonpolar hydrocarbon diluent using a conventional Ziegler-Natta-type or Phillips-type catalyst and a polyvalent metal salt of an organic acid having a molecular weight of at least 300.

There are various other known methods for improving operability including coating the polymerization equipment, for example, treating the walls of a reactor using chromium compounds as described in U.S. Pat. Nos. 4,532,311 and 4,876,320; injecting various agents into the process, for example PCT Publication WO 97/46599 published Dec. 11, 1997 discusses feeding into a lean zone in a polymerization reactor an unsupported, soluble metallocene catalyst system and injecting antifoulants or antistatic agents into the reactor; controlling the polymerization rate, particularly on start-up; and reconfiguring the reactor design.

Others in the art to improve process operability have discussed modifying the catalyst system by preparing the catalyst system in different ways. For example, methods in the art include combining the catalyst system components in a particular order; manipulating the ratio of the various catalyst system components; varying the contact time and/or temperature when combining the components of a catalyst system; or simply adding various compounds to the catalyst system. Especially illustrative in the art is the preparation procedures and methods for producing bulky ligand metallocene catalyst systems, more particularly supported bulky ligand metallocene catalyst systems with reduced tendencies for fouling and better operability. Examples of these include: WO 96/11961 published Apr. 26, 1996 discusses as a component of a supported catalyst system an antistatic agent for reducing fouling and sheeting in a gas, slurry or liquid pool polymerization process; U.S. Pat. No. 5,283,278 is directed towards the prepolymerization of a metallocene catalyst or a conventional Ziegler-Natta catalyst in the presence of an antistatic agent; U.S. Pat. Nos. 5,332,706 and 5,473,028 have resorted to a particular technique for forming a catalyst by incipient impregnation; U.S. Pat. Nos. 5,427,991 and 5,643,847 describe the chemical bonding of non-coordinating anionic activators to supports; U.S. Pat. No. 5,492,975 discusses polymer bound metallocene catalyst systems; U.S. Pat. No. 5,661,095 discusses supporting a metallocene catalyst on a copolymer of an olefin and an unsaturated silane; PCT publication WO 97/06186 published Feb. 20, 1997 teaches removing inorganic and organic impurities after formation of the metallocene catalyst itself; PCT publication WO 97/15602 published May 1, 1997 discusses readily supportable metal complexes; PCT publication WO 97/27224 published Jul. 31, 1997 relates to forming a supported transition metal compound in the presence of an unsaturated organic compound having at least one terminal double bond; and EP-A2-811 638 discusses using a metallocene catalyst and an activating cocatalyst in a polymerization process in the presence of a nitrogen containing antistatic agent.

While all these possible solutions might reduce the level of fouling or sheeting somewhat, some are expensive to employ and/or may not reduce fouling and sheeting to a level sufficient to successfully operate a continuous process, particularly a commercial or large-scale process.

Applicants discovered that using a carboxylate metal salt in conjunction with a supported catalyst system, preferably a bulky ligand metallocene catalyst system, more preferably a supported bulky ligand metallocene catalyst system, substantially improves process operability. See for example U.S. patent application Ser. No. 09/397,409, filed Sep. 16, 1999 and U.S. patent application Ser. No. 09/397,410, filed Sep. 16, 1999, which are both herein fully incorporated by reference. However, as a result of using this combination, the improved supported catalyst composition becomes somewhat more difficult to feed to a reactor. The supported catalyst becomes sticky or statically inclined, thus preventing its continuous and smooth introduction into the reactor.

Thus, it would be advantageous to have an improved catalyst composition that flows more easily and is capable of operating in a polymerization process continuously with enhanced reactor operability.

SUMMARY OF THE INVENTION

This invention provides a method of making a new and improved flowing supported catalyst system, particularly a supported bulky ligand metallocene catalyst system, that contains a carboxylate metal salt, and for the catalyst systems use in a polymerizing process.

The invention also provides for a catalyst composition of a catalyst system and a carboxylate metal salt that is useful in a polymerization process. In one embodiment, the carboxylate metal salt is present in the composition in an amount greater than 3.5 weight percent based on the total weight of the catalyst composition. In one embodiment, the method of the invention comprises the step of combining, contacting, blending and/or mixing a catalyst system, preferably a supported catalyst system, with a carboxylate metal salt wherein the catalyst system is heated to a temperature above room temperature, preferably above 30° C. In one embodiment the catalyst system comprises a conventional-type transition metal catalyst compound. In the most preferred embodiment the catalyst system comprises a bulky ligand metallocene catalyst compound. The combination of the heated catalyst system and the carboxylate metal salt is useful in any olefin polymerization process. The preferred polymerization processes are a gas phase or a slurry phase process, most preferably a gas phase process.

In an embodiment, the invention provides for a method of making a catalyst composition useful for the polymerization of olefin(s), the method including combining, contacting, blending and/or mixing a polymerization catalyst with at least one carboxylate metal salt wherein the polymerization catalyst is heated to a temperature above room temperature, preferably greater than 30° C., prior to being contacted with the carboxylate metal salt. In an embodiment, the polymerization catalyst is a conventional-type transition metal polymerization catalyst, more preferably a supported conventional-type transition metal polymerization catalyst. In the most preferred embodiment, the polymerization catalyst is a bulky ligand metallocene catalyst, most preferably a supported bulky ligand metallocene polymerization catalyst.

In one preferred embodiment, the invention is directed to a catalyst composition comprising a catalyst compound, preferably a conventional-type transition metal catalyst compound, more preferably a bulky ligand metallocene catalyst compound, an activator and/or cocatalyst, a carrier, and a carboxylate metal salt. In this embodiment, the catalyst compound, the activator and the carrier are heated to a temperature above room temperature, preferably greater than 30° C. Further, in this embodiment, it is preferred that the carboxylate metal salt is present in an amount greater than 3.5 weight percent based on the total weight based on the total weight of the catalyst compound.

In yet another embodiment, the invention relates to a process for polymerizing olefin(s) in the presence of a catalyst composition comprising a polymerization catalyst and a carboxylate metal salt, wherein the polymerization catalyst is heated to a temperature greater than room temperature, preferably greater than 30° C., prior to contacting or combining with the carboxylate metal salt, preferably the polymerization catalyst comprises a carrier, more preferably the polymerization catalyst comprises one or more of combination of a conventional-type catalyst compound and/or a bulky ligand metallocene catalyst compound.

In a preferred method for making the catalyst composition of the invention, the method comprises the steps of combining a bulky ligand metallocene catalyst compound, an activator and a carrier to form a supported bulky ligand metallocene catalyst system, heating the supported bulky ligand metallocene catalyst system to a temperature greater than room temperature, preferably greater than 30° C., contacting the supported bulky ligand metallocene catalyst compound a carboxylate metal salt. In the most preferred embodiment, the supported bulky ligand metallocene catalyst system and the carboxylate metal salt are in a substantially dry state or dried state.

In an embodiment, the invention provides for a process for polymerizing olefin(s) in the presence of a polymerization catalyst that has been heated to a temperature greater than room temperature, preferably greater than 30° C., prior to being combined, contacted, blended, or mixed with at least one carboxylate metal salt.

DETAILED DESCRIPTION OF THE INVENTION

Introduction

The invention is directed toward a method for making a supported catalyst system. It has been suprisingly discovered that combining a pre-heated supported catalyst, preferably a bulky ligand metallocene catalyst system, with a carboxylate metal salt, results in a supported catalyst system with improved flowability and operability. Carboxylate metal salts are difficult to handle, particularly, because of their poor morphology, low bulk density, and fluffy consistency. Therefore, combining the carboxylate metal salt with a supported catalyst system is a challenge. Increasing the amount of carboxylate metal salt used with a polymerization catalyst, requires extended mixing times, resulting in a decrease in catalyst flow. Furthermore, increasing the amount of carboxylate metal salt used with a supported catalyst system can effect catalyst activity. However, combining a carboxylate metal salt with a heated or hot supported catalyst results in a catalyst composition containing more carboxylate metal salt, without a decrease in catalyst activity.

Conventional Transition Metal Catalysts

Conventional transition metal catalysts are those traditional Ziegler-Natta catalysts and Phillips-type chromium catalyst well known in the art. Examples of conventional transition metal catalysts are discussed in U.S. Pat. Nos.

4,115,639, 4,077,904 4,482,687, 4,564,605, 4,721,763, 4,879,359 and 4,960,741 all of which are herein fully incorporated by reference. The conventional transition metal catalyst compounds that may be used in the present invention include transition metal compounds from Groups III to VIII, preferably IVB to VIB of the Periodic Table of Elements.

These conventional transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R include alkoxy, phenoxy, bromide, chloride and fluoride. Non-limiting examples of conventional transition metal catalysts where M is titanium include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566, which are herein fully incorporate by reference. The $MgTiCl_6$(ethyl acetate)$_4$ derivative is particularly preferred. British Patent Application 2,105,355, herein incorporated by reference, describes various conventional-type vanadium catalyst compound.

Conventional chromium catalyst compounds, often referred to as Phillips-type catalysts, suitable for use in the present invention include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in U.S. Pat. Nos. 2,285,721, 3,242,099 and 3,231,550, which are herein fully incorporated by reference.

Still other conventional transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436, which are all herein incorporated by reference.

Other catalysts may include cationic catalysts such as $AlCl_3$, and other cobalt and iron catalysts well known in the art.

Typically, these conventional transition metal catalyst compounds excluding some conventional chromium catalyst compounds are activated with one or more of the conventional cocatalysts described below.

Conventional Cocatalysts

Conventional cocatalyst compounds for the above conventional transition metal catalyst compounds may be represented by the formula $M^3M^4{}_v X^2{}_c R^3{}_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3{}_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Non-limiting examples of conventional-type organometallic cocatalyst compounds of Group IA, IIA, IIB and IIIA useful with the conventional-type catalyst compounds described above include methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds include mono-organohalides and hydrides of Group IIA metals, and mono- or di-organohalides and hydrides of Group IIIA metals. Non-limiting examples of such conventional-type cocatalyst compounds include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415, which are herein fully incorporated by reference.

For purposes of this patent specification and appended claims conventional transition metal catalyst compounds exclude those bulky ligand metallocene catalyst compounds discussed below.

Bulky Ligand Metallocene Catalyst Compounds

Generally, bulky ligand metallocene catalyst compounds include half and full sandwich compounds having one or more bulky ligands bonded to at least one metal atom. Typical bulky ligand metallocene compounds are generally described as containing one or more bulky ligand(s) and one or more leaving group(s) bonded to at least one metal atom. In one preferred embodiment, at least one bulky ligand is η-bonded to the metal atom, most preferably $\eta^5$-bonded to the metal atom.

The bulky ligands are generally represented by one or more open, acyclic, or fused ring(s) or ring system(s) or a combination thereof. These bulky ligands, preferably the ring(s) or ring system(s) are typically composed of atoms selected from Groups 13 to 16 atoms of the Periodic Table of Elements, preferably the atoms are selected from the group consisting of carbon, nitrogen, oxygen, silicon, sulfur, phosphorous, germanium, boron and aluminum or a combination thereof. Most preferably the ring(s) or ring system (s) are composed of carbon atoms such as but not limited to those cyclopentadienyl ligands or cyclopentadienyl-type ligand structures or other similar functioning ligand structure such as a pentadiene, a cyclooctatetraendiyl or an imide ligand. The metal atom is preferably selected from Groups 3 through 15 and the lanthanide or actinide series of the Periodic Table of Elements. Preferably the metal is a transition metal from Groups 4 through 12, more preferably Groups 4, 5 and 6, and most preferably the transition metal is from Group 4.

In one embodiment, the bulky ligand metallocene catalyst compounds of the invention are represented by the formula:

$$L^A L^B MQ_n \qquad (I)$$

where M is a metal atom from the Periodic Table of the Elements and may be a Group 3 to 12 metal or from the lanthanide or actinide series of the Periodic Table of Elements, preferably M is a Group 4, 5 or 6 transition metal, more preferably M is a Group 4 transition metal, even more preferably M is zirconium, hafnium or titanium. The bulky ligands, $L^A$ and $L^B$, are open, acyclic or fused ring(s) or ring system(s) and are any ancillary ligand system, including unsubstituted or substituted, cyclopentadienyl ligands or cyclopentadienyl-type ligands, heteroatom substituted and/ or heteroatom containing cyclopentadienyl-type ligands. Non-limiting examples of bulky ligands include cyclopentadienyl ligands, cyclopentaphenanthreneyl ligands, indenyl ligands, benzindenyl ligands, fluorenyl ligands, octahydrofluorenyl ligands, cyclooctatetraendiyl ligands, cyclopentacyclododecene ligands, azenyl ligands, azulene ligands, pentalene ligands, phosphoyl ligands, phosphinimine (WO 99/40125), pyrrolyl ligands, pyrozolyl ligands, carbazolyl ligands, borabenzene ligands and the like, including hydrogenated versions thereof, for example tetrahydroindenyl ligands. In one embodiment, $L^A$ and $L^B$ may be any other ligand structure capable of η-bonding to M, preferably $η^3$-bonding to M and most preferably $η^5$-bonding. In yet another embodiment, the atomic molecular weight (MW) of $L^A$ or $L^B$ exceeds 60 a.m.u., preferably greater than 65 a.m.u. In another embodiment, $L^A$ and $L^B$ may comprise one or more heteroatoms, for example, nitrogen, silicon, boron, germanium, sulfur and phosphorous, in combination with carbon atoms to form an open, acyclic, or preferably a fused, ring or ring system, for example, a hetero-cyclopentadienyl ancillary ligand. Other $L^A$ and $L^B$ bulky ligands include but are not limited to bulky amides, phosphides, alkoxides, aryloxides, imides, carbolides, borollides, porphyrins, phthalocyanines, corrins and other polyazomacrocycles. Independently, each $L^A$ and $L^B$ may be the same or different type of bulky ligand that is bonded to M. In one embodiment of formula (I) only one of either $L^A$ or $L^B$ is present.

Independently, each $L^A$ and $L^B$ may be unsubstituted or substituted with a combination of substituent groups R. Non-limiting examples of substituent groups R include one or more from the group selected from hydrogen, or linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl- carbamoyl radicals, acyloxy radicals, acylamino radicals, aroylamino radicals, straight, branched or cyclic, alkylene radicals, or combination thereof. In a preferred embodiment, substituent groups R have up to 50 non-hydrogen atoms, preferably from 1 to 30 carbon, that can also be substituted with halogens or heteroatoms or the like. Non-limiting examples of alkyl substituents R include methyl, ethyl, propyl, butyl, pentyl, hexyl, cyclopentyl, cyclohexyl, benzyl or phenyl groups and the like, including all their isomers, for example tertiary butyl, isopropyl, and the like. Other hydrocarbyl radicals include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis (difluoromethyl)silyl, bromomethyldimethylgermyl and the like; and disubstitiuted boron radicals including dimethylboron for example; and disubstituted pnictogen radicals including dimethylamine, dimethylphosphine, diphenylamine, methylphenylphosphine, chalcogen radicals including methoxy, ethoxy, propoxy, phenoxy, methylsulfide and ethylsulfide. Non-hydrogen substituents R include the atoms carbon, silicon, boron, aluminum, nitrogen, phosphorous, oxygen, tin, sulfur, germanium and the like, including olefins such as but not limited to olefinically unsaturated substituents including vinyl-terminated ligands, for example but-3-enyl, prop-2-enyl, hex-5-enyl and the like. Also, at least two R groups, preferably two adjacent R groups, are joined to form a ring structure having from 3 to 30 atoms selected from carbon, nitrogen, oxygen, phosphorous, silicon, germanium, aluminum, boron or a combination thereof. Also, a substituent group R group such as 1-butanyl may form a carbon sigma bond to the metal M.

Other ligands may be bonded to the metal M, such as at least one leaving group Q. For the purposes of this patent specification and appended claims the term "leaving group" is any ligand that can be abstracted from a bulky ligand metallocene catalyst compound to form a bulky ligand metallocene catalyst cation capable of polymerizing one or more olefin(s). In one embodiment, Q is a monoanionic labile ligand having a sigma-bond to M. Depending on the oxidation state of the metal, the value for n is 0, 1 or 2 such that formula (I) above represents a neutral bulky ligand metallocene catalyst compound.

Non-limiting examples of Q ligands include weak bases such as amines, phosphines, ethers, carboxylates, dienes, hydrocarbyl radicals having from 1 to 20 carbon atoms, hydrides or halogens and the like or a combination thereof. In another embodiment, two or more Q's form a part of a fused ring or ring system. Other examples of Q ligands include those substituents for R as described above and including cyclobutyl, cyclohexyl, heptyl, tolyl, trifluromethyl, tetramethylene, pentamethylene, methylidene, methyoxy, ethyoxy, propoxy, phenoxy, bis(N-methylanilide), dimethylamide, dimethylphosphide radicals and the like.

In one embodiment, the bulky ligand metallocene catalyst compounds of the invention include those of formula (I) where $L^A$ and $L^B$ are bridged to each other by at least one bridging group, A, such that the formula is represented by $$L^A A L^B M Q_n \tag{II}$$

These bridged compounds represented by formula (II) are known as bridged, bulky ligand metallocene catalyst compounds. $L^A$, $L^B$, M, Q and n are as defined above. Non-limiting examples of bridging group A include bridging groups containing at least one Group 13 to 16 atom, often referred to as a divalent moiety such as but not limited to at least one of a carbon, oxygen, nitrogen, silicon, aluminum, boron, germanium and tin atom or a combination thereof. Preferably bridging group A contains a carbon, silicon or germanium atom, most preferably A contains at least one silicon atom or at least one carbon atom. The bridging group A may also contain substituent groups R as defined above including halogens and iron. Non-limiting examples of bridging group A may be represented by $R'_2C$, $R'_2Si$, $R'_2Si$  $R'_2Si$, $R'_2Ge$, R'P, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted pnictogen, substituted chalcogen, or halogen or two or more R' may be joined to form a ring or ring system. In one embodiment, the bridged, bulky ligand metallocene catalyst compounds of formula (II) have two or more bridging groups A (EP 664 301 B1).

In one embodiment, the bulky ligand metallocene catalyst compounds are those where the R substituents on the bulky ligands $L^A$ and $L^B$ of formulas (I) and (II) are substituted with the same or different number of substituents on each of the bulky ligands. In another embodiment, the bulky ligands $L^A$ and $L^B$ of formulas (I) and (II) are different from each other.

Other bulky ligand metallocene catalyst compounds and catalyst systems useful in the invention may include those described in U.S. Pat. Nos. 5,064,802, 5,145,819, 5,149,819, 5,243,001, 5,239,022, 5,276,208, 5,296,434, 5,321,106, 5,329,031, 5,304,614, 5,677,401, 5,723,398, 5,753,578, 5,854,363, 5,856,547 5,858,903, 5,859,158, 5,900,517, 5,939,503 and 5,962,718 and PCT publications WO 93/08221, WO 93/08199, WO 95/07140, WO 98/11144, WO 98/41530, WO 98/41529, WO 98/46650, WO 99/02540 and WO 99/14221 and European publications EP-A-0 578 838, EP-A-0 638 595, EP-B-0 513 380, EP-A1-0 816 372, EP-A2-0 839 834, EP-B1-0 632 819, EP-B1-0 739 361, EP-B1-0 748 821 and EP-B1-0 757 996, all of which are herein fully incorporated by reference.

In one embodiment, bulky ligand metallocene catalysts compounds useful in the invention include bridged heteroatom, mono-bulky ligand metallocene compounds. These types of catalysts and catalyst systems are described in, for example, PCT publication WO 92/00333, WO 94/07928, WO 91/04257, WO 94/03506, WO96/00244, WO 97/15602 and WO 99/20637 and U.S. Pat. Nos. 5,057,475, 5,096,867, 5,055,438, 5,198,401, 5,227,440 and 5,264,405 and European publication EP-A-0 420 436, all of which are herein fully incorporated by reference.

In this embodiment, the bulky ligand metallocene catalyst compound is represented by the formula:

$$L^C A J M Q_n \qquad (III)$$

where M is a Group 3 to 16 metal atom or a metal selected from the Group of actinides and lanthanides of the Periodic Table of Elements, preferably M is a Group 4 to 12 transition metal, and more preferably M is a Group 4, 5 or 6 transition metal, and most preferably M is a Group 4 transition metal in any oxidation state, especially titanium; $L^C$ is a substituted or unsubstituted bulky ligand bonded to M; J is bonded to M; A is bonded to $L^C$ and J; J is a heteroatom ancillary ligand; and A is a bridging group; Q is a univalent anionic ligand; and n is the integer 0, 1 or 2. In formula (III) above, $L^C$, A and J form a fused ring system. In an embodiment, $L^C$ of formula (III) is as defined above for $L^A$, A, M and Q of formula (III) are as defined above in formula (I).

In formula (III) J is a heteroatom containing ligand in which J is an element with a coordination number of three from Group 15 or an element with a coordination number of two from Group 16 of the Periodic Table of Elements. Preferably J contains a nitrogen, phosphorus, oxygen or sulfur atom with nitrogen being most preferred.

In another embodiment, the bulky ligand type metallocene catalyst compound is a complex of a metal, preferably a transition metal, a bulky ligand, preferably a substituted or unsubstituted pi-bonded ligand, and one or more heteroallyl moieties, such as those described in U.S. Pat. Nos. 5,527,752 and 5,747,406 and EP-B1-0 735 057, all of which are herein fully incorporated by reference.

In an embodiment, the bulky ligand metallocene catalyst compound is represented by the formula:

$$L^D M Q_2 (YZ) X_n \qquad (IV)$$

where M is a Group 3 to 16 metal, preferably a Group 4 to 12 transition metal, and most preferably a Group 4, 5 or 6 transition metal; $L^D$ is a bulky ligand that is bonded to M; each Q is independently bonded to M and $Q_2$(YZ) forms a unicharged polydentate ligand; A or Q is a univalent anionic ligand also bonded to M; X is a univalent anionic group when n is 2 or X is a divalent anionic group when n is 1; n is 1 or 2.

In formula (IV), L and M are as defined above for formula (I). Q is as defined above for formula (I), preferably Q is selected from the group consisting of —O—, —NR—, —CR$_2$— and —S—; Y is either C or S; Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from one of the group consisting of —OR, —NR$_2$, —SR, —SiR$_3$, —PR$_2$ and —H; R is selected from a group containing carbon, silicon, nitrogen, oxygen, and/or phosphorus, preferably where R is a hydrocarbon group containing from 1 to 20 carbon atoms, most preferably an alkyl, cycloalkyl, or an aryl group; n is an integer from 1 to 4, preferably 1 or 2; X is a univalent anionic group when n is 2 or X is a divalent anionic group when n is 1; preferably X is a carbamate, carboxylate, or other heteroallyl moiety described by the Q, Y and Z combination.

In another embodiment of the invention, the bulky ligand metallocene-type catalyst compounds are heterocyclic ligand complexes where the bulky ligands, the ring(s) or ring system(s), include one or more heteroatoms or a combination thereof. Non-limiting examples of heteroatoms include a Group 13 to 16 element, preferably nitrogen, boron, sulfur, oxygen, aluminum, silicon, phosphorous and tin. Examples of these bulky ligand metallocene catalyst compounds are described in WO 96/33202, WO 96/34021, WO 97/17379, WO 98/22486 and WO 99/40095 (dicarbamoyl metal complexes) and EP-A1-0 874 005 and U.S. Pat. Nos. 5,637,660, 5,539,124, 5,554,775, 5,756,611, 5,233,049, 5,744,417, and 5,856,258 all of which are herein incorporated by reference.

In another embodiment, the bulky ligand metallocene catalyst compounds are those complexes known as transition metal catalysts based on bidentate ligands containing pyridine or quinoline moieties, such as those described in U.S. application Ser. No. 09/103,620 filed Jun. 23, 1998, which is herein incorporated by reference. In another embodiment, the bulky ligand metallocene catalyst compounds are those described in PCT publications WO 99/01481 and WO 98/42664, which are fully incorporated herein by reference.

In one embodiment, the bulky ligand metallocene catalyst compound is represented by the formula:

$$((Z)XA_t(YJ))_q M Q_n \qquad (V)$$

where M is a metal selected from Group 3 to 13 or lanthanide and actinide series of the Periodic Table of Elements; Q is bonded to M and each Q is a monovalent, bivalent, or trivalent anion; X and Y are bonded to M; one or more of X and Y are heteroatoms, preferably both X and Y are heteroatoms; Y is contained in a heterocyclic ring J, where J comprises from 2 to 50 non-hydrogen atoms, preferably 2 to 30 carbon atoms; Z is bonded to X, where Z comprises 1 to 50 non-hydrogen atoms, preferably 1 to 50 carbon atoms, preferably Z is a cyclic group containing 3 to 50 atoms, preferably 3 to 30 carbon atoms; t is 0 or 1; when t is 1, A is a bridging group joined to at least one of X, Y or J, preferably X and J; q is 1 or 2; n is an integer from 1 to 4 depending on the oxidation state of M. In one embodiment, where X is oxygen or sulfur then Z is optional. In another embodiment, where X is nitrogen or phosphorous then Z is present. In an embodiment, Z is preferably an aryl group, more preferably a substituted aryl group.

Other Bulky Ligand Metallocene Catalyst Compounds

It is within the scope of this invention, in one embodiment, that the bulky ligand metallocene catalyst compounds include complexes of $Ni^{2+}$ and $Pd^{2+}$ described in the articles Johnson, et al., "New Pd(II)- and Ni(II)-Based Catalysts for Polymerization of Ethylene and a-Olefins", J. Am. Chem. Soc. 1995, 117, 6414–6415 and Johnson, et al., "Copolymerization of Ethylene and Propylene with Functionalized Vinyl Monomers by Palladium(II) Catalysts", J. Am. Chem. Soc., 1996, 118, 267–268, and WO 96/23010 published Aug. 1, 1996, WO 99/02472, U.S. Pat. Nos. 5,852,145, 5,866,663 and 5,880,241, which are all herein fully incorporated by reference. These complexes can be either dialkyl ether adducts, or alkylated reaction products of the described dihalide complexes that can be activated to a cationic state by the activators of this invention described below.

Also included as bulky ligand metallocene catalyst are those diimine based ligands of Group 8 to 10 metal compounds disclosed in PCT publications WO 96/23010 and WO 97/48735 and Gibson, et. al., Chem. Comm., pp. 849–850 (1998), all of which are herein incorporated by reference.

Other bulky ligand metallocene catalysts are those Group 5 and 6 metal imido complexes described in EP-A2-0 816 384 and U.S. Pat. No. 5,851,945, which is incorporated herein by reference. In addition, bulky ligand metallocene catalysts include bridged bis(arylamido) Group 4 compounds described by D. H. McConville, et al., in Organometallics 1195, 14, 5478–5480, which is herein incorporated by reference. In addition, bridged bis(amido) catalyst compounds are described in WO 96/27439, which is herein incorporated by reference. Other bulky ligand metallocene catalysts are described as bis(hydroxy aromatic nitrogen ligands) in U.S. Pat. No. 5,852,146, which is incorporated herein by reference. Other metallocene catalysts containing one or more Group 15 atoms include those described in WO 98/46651, which is incorporated herein by reference. Still another metallocene bulky ligand metallocene catalysts include those multinuclear bulky ligand metallocene catalysts as described in WO 99/20665, which is incorporated herein by reference.

It is also contemplated that in one embodiment, the bulky ligand metallocene catalysts of the invention described above include their structural or optical or enantiomeric isomers (meso and racemic isomers, for example see U.S. Pat. No. 5,852,143, incorporated herein by reference) and mixtures thereof.

Activator and Activation Methods for the Bulky Ligand Metallocene Catalyst Compounds The above described bulky ligand metallocene catalyst compounds are typically activated in various ways to yield catalyst compounds having a vacant coordination site that will coordinate, insert, and polymerize olefin(s).

For the purposes of this patent specification and appended claims, the term "activator" is defined to be any compound or component or method which can activate any of the bulky ligand metallocene catalyst compounds or other catalyst compounds of the invention as described above. Non-limiting activators, for example may include a Lewis acid or a non-coordinating ionic activator or ionizing activator or any other compound including Lewis bases, aluminum alkyls, conventional-type cocatalysts and combinations thereof that can convert a neutral bulky ligand metallocene catalyst compound to a catalytically active bulky ligand metallocene cation. It is within the scope of this invention to use alumoxane or modified alumoxane as an activator, and/or to also use ionizing activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (WO 98/43983) or combination thereof, that would ionize the neutral bulky ligand metallocene catalyst compound.

In one embodiment, an activation method using ionizing ionic compounds not containing an active proton but capable of producing both a bulky ligand metallocene catalyst cation and a non-coordinating anion are also contemplated, and are described in EP-A-0 426 637, EP-A-0 573 403 and U.S. Pat. No. 5,387,568, which are all herein incorporated by reference.

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, and PCT publication WO 94/10180, all of which are herein fully incorporated by reference.

Organoaluminum compounds useful as activators include trimethylaluminum, triethylaluminum, triisobutylaluminum, tri-n-hexylaluminum, tri-n-octylaluminum and the like.

Ionizing compounds may contain an active proton, or some other cation associated with but not coordinated to or only loosely coordinated to the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Other activators include those described in PCT publication WO 98/07515 such as tris (2,2',2"-nonafluorobiphenyl) fluoroaluminate, which publication is fully incorporated herein by reference. Combinations of activators are also contemplated by the invention, for example, alumoxanes and ionizing activators in combinations, see for example, EP-B1 0 573 120, PCT publications WO 94/07928 and WO 95/14044 and U.S. Pat. Nos. 5,153,157 and 5,453,410 all of which are herein fully incorporated by reference. WO 98/09996 incorporated herein by reference describes activating bulky ligand metallocene catalyst compounds with perchlorates, periodates and iodates including their hydrates. WO 98/30602 and WO 98/30603 incorporated by reference describe the use of lithium (2,2'-bisphenyl-ditrimethylsilicate)•4THF as an activator for a bulky ligand metallocene catalyst compound. WO 99/18135 incorporated herein by reference describes the use of organo-boron-aluminum activators. EP-B1-0 781 299 describes using a silylium salt in combination with a non-coordinating compatible anion. Also, methods of activation such as using radiation (see EP-B1-0 615 981 herein incorporated by reference), electro-chemical oxidation, and the like are also contemplated as activating methods for the purposes of rendering the neutral bulky ligand metallocene catalyst compound or precursor to a bulky ligand metallocene cation capable of polymerizing olefins. Other activators or methods for activating a bulky ligand metallocene catalyst compound are described in for example, U.S. Pat. Nos. 5,849,852, 5,859,653 and 5,869,723 and WO 98/32775, WO 99/42467 (dioctadecylmethylammonium-bis(tris(pentafluorophenyl) borane)benzimidazolide), which are herein incorporated by reference It is also within the scope of this invention that one or more of the above described bulky ligand metallocene catalyst compounds or conventional catalyst compounds can be combined with one or more activators or activation methods described above.

It is further contemplated by the invention that other catalysts can be combined with the bulky ligand metallocene catalyst compounds of the invention. For example, see U.S. Pat. Nos. 4,937,299, 4,935,474, 5,281,679, 5,359,015, 5,470,811, and 5,719,241 all of which are herein fully incorporated herein reference. It is also contemplated that any one of the bulky ligand metallocene catalyst compounds of the invention have at least one fluoride or fluorine containing leaving group as described in U.S. application Ser. No. 09/191,916 filed Nov. 13, 1998.

In another embodiment of the invention one or more bulky ligand metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996, all of which are herein fully incorporated by reference.

Carboxylate Metal Salt

Carboxylate metal salts are well known in the art as additives for use with polyolefins, for example as a film processing aid. These types of post reactor processing additives are commonly used as emulsifying agents, antistat and antifogging agents, stabilizers, foaming aids, lubrication aids, mold release agents, nucleating agents, and slip and antiblock agents and the like. Thus, it was truly unexpected that these post reactor agents or aids would be useful with a polymerization catalyst to improve the operability of a polymerization process.

For the purposes of this patent specification and appended claims the term "carboxylate metal salt" is any mono- or di- or tri-carboxylic acid salt with a metal portion from the Periodic Table of Elements. Non-limiting examples include saturated, unsaturated, aliphatic, aromatic or saturated cyclic carboxylic acid salts where the carboxylate ligand has preferably from 2 to 24 carbon atoms, such as acetate, propionate, butyrate, valerate, pivalate, caproate, isobuytlacetate, t-butyl-acetate, caprylate, heptanate, pelargonate, undecanoate, oleate, octoate, palmitate, myristate, margarate, stearate, arachate and tercosanoate. Non-limiting examples of the metal portion includes a metal from the Periodic Table of Elements selected from the group of Al, Mg, Ca, Sr, Sn, Ti, V, Ba, Zn, Cd, Hg, Mn, Fe, Co, Ni, Pd, Li and Na.

In one embodiment, the carboxylate metal salt is represented by the following general formula:

$$M(Q)_x(OOCR)_Y$$

where M is a metal from Groups 1 to 16 and the Lanthanide and Actinide series, preferably from Groups 1 to 7 and 13 to 16, more preferably from Groups 3 to 7 and 13 to 16, even more preferably Groups 2 and 13, and most preferably Group 13; Q is halogen, hydrogen, a hydroxy or hydroxide, alkyl, alkoxy, aryloxy, siloxy, silane sulfonate group or siloxane; R is a hydrocarbyl radical having from 2 to 100 carbon atoms, preferably 4 to 50 carbon atoms; and x is an integer from 0 to 3 and y is an integer from 1 to 4 and the sum of x and y is equal to the valence of the metal. In a preferred embodiment of the above formula y is an integer from 1 to 3, preferably 1 to 2, especially where M is a Group 13 metal.

Non-limiting examples of R in the above formula include hydrocarbyl radicals having 2 to 100 carbon atoms that include alkyl, aryl, aromatic, aliphatic, cyclic, saturated or unsaturated hydrocarbyl radicals. In an embodiment of the invention, R is a hydrocarbyl radical having greater than or equal to 8 carbon atoms, preferably greater than or equal to 12 carbon atoms and more preferably greater than or equal to 17 carbon atoms. In another embodiment R is a hydrocarbyl radical having from 17 to 90 carbon atoms, preferably 17 to 72, and most preferably from 17 to 54 carbon atoms.

Non-limiting examples of Q in the above formula include one or more, same or different, hydrocarbon containing group such as alkyl, cycloalkyl, aryl, alkenyl, arylalkyl, arylalkenyl or alkylaryl, alkylsilane, arylsilane, alkylamine, arylamine, alkyl phosphide, alkoxy having from 1 to 30 carbon atoms. The hydrocarbon containing group may be linear, branched, or even substituted. Also, Q in one embodiment is an inorganic group such as a halide, sulfate or phosphate In one embodiment, the more preferred carboxylate metal salts are those aluminum carboxylates such as aluminum mono, di- and tri-stearates, aluminum octoates, oleates and cyclohexylbutyrates. In yet a more preferred embodiment, the carboxylate metal salt is $(CH_3(CH_2)_{16}COO)_3Al$, a aluminum tri-stearate (preferred melting point 115° C.), $(CH_3(CH_2)_{16}COO)_2$—Al—OH, a aluminum di-stearate (preferred melting point 145° C.), and a $CH_3(CH_2)_{16}COO$—Al(OH)$_2$, an aluminum mono-stearate (preferred melting point 155° C.).

Non-limiting commercially available carboxylate metal salts for example include Witco Aluminum Stearate # 18, Witco Aluminum Stearate # 22, Witco Aluminum Stearate # 132 and Witco Aluminum Stearate EA Food Grade, all of which are available from Witco Corporation, Memphis, Tenn.

In one embodiment the carboxylate metal salt has a melting point from about 30° C. to about 250° C., more preferably from about 37° C. to about 220° C., even more preferably from about 50° C. to about 200° C., and most preferably from about 100° C. to about 200° C. In a most preferred embodiment, the carboxylate metal salt is an aluminum stearate having a melting point in the range of from about 135° C. to about 165° C.

In another preferred embodiment the carboxylate metal salt has a melting point greater than the polymerization temperature in the reactor.

Other examples of carboxylate metal salts include titanium stearates, tin stearates, calcium stearates, zinc stearates, boron stearate and strontium stearates.

The carboxylate metal salt in one embodiment may be combined with antistatic agents such as fatty amines, for example, Kemamine AS 990/2 zinc additive, a blend of ethoxylated stearyl amine and zinc stearate, or Kemamine AS 990/3, a blend of ethoxylated stearyl amine, zinc stearate and octadecyl-3,5-di-tert-butyl-4-hydroxyhydrocinnamate. Both these blends are available from Witco Corporation, Memphis, Tenn.

Supports, Carriers and General Supporting Techniques

The above described catalyst compounds, particularly the bulky ligand metallocene catalyst compounds and catalyst systems, may be combined with one or more support materials or carriers using one of the support methods well known in the art or as described below. For example, in a most preferred embodiment, a bulky ligand metallocene catalyst compound or catalyst system is in a supported form, for example deposited on, contacted with, vaporized with, bonded to, or incorporated within, adsorbed or absorbed in, or on, a support or carrier.

The terms "support" or "carrier" are used interchangeably and are any support material, preferably a porous support material, including inorganic or organic support materials. Non-limiting examples of inorganic support materials include inorganic oxides and inorganic chlorides. Other carriers include resinous support materials such as polystyrene, functionalized or crosslinked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina and mixtures thereof. Other useful supports include magnesia, titania, zirconia, magnesium chloride, montmorillonite (EP-B1 0 511 665), phyllosilicate, zeolites, talc, clays and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, which is herein incorporated by reference.

It is preferred that the carrier, most preferably an inorganic oxide, has a surface area in the range of from about 10 to about 700 $m^2/g$, pore volume in the range of from about 0.1 to about 4.0 cc/g and average particle size in the range of from about 5 to about 500 $\mu$m. More preferably, the surface area of the carrier is in the range of from about 50 to about 500 $m^2/g$, pore volume of from about 0.5 to about 3.5 cc/g and average particle size of from about 10 to about 200 $\mu$m. Most preferably the surface area of the carrier is in the range is from about 100 to about 1000 $m^2/g$, pore volume from about 0.8 to about 5.0 cc/g and average particle size is from about 5 to about 100 $\mu$m. The average pore size of the carrier of the invention typically has pore size in the range of from 10 to 1000 Å, preferably 50 to about 500 Å, and most preferably 75 to about 450 Å.

Examples of supporting bulky ligand metallocene catalyst systems are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,698,487, 5,714,424, 5,723,400, 5,723,402, 5,731,261, 5,759,940, 5,767,032, 5,770,664, 5,846,895 and 5,939,348 and U.S. application Ser. No. 271,598 filed Jul. 7, 1994 and Ser. No. 788,736 filed Jan. 23, 1997 and PCT publications WO 95/32995, WO 95/14044, WO 96/06187 and WO 97/02297, and EP-B1-0 685 494 all of which are herein fully incorporated by reference.

The method for making the catalyst composition generally involves the combining, contacting, blending, and/or mixing of a catalyst system or polymerization catalyst with a carboxylate metal salt, wherein the catalyst system or polymerization catalyst is heated to a temperature greater than room temperature (25° C.), and then, contacted with the carboxylate metal salt. In another embodiment, the temperature is greater than 30 C, preferably greater than 40° C., more preferably greater than 50° C., even more preferably greater than 60° C., and most preferably greater than 70° C.

In one embodiment of the method of the invention, a conventional-type transition metal catalyst and/or a bulky ligand metallocene catalyst is combined, contacted, blended, and/or mixed with at least one carboxylate metal salt, wherein the catalyst is pre-heated to a temperature greater than 30° C., more preferably greater than 50° C., even more preferably greater than 60° C., and most preferably greater than 70° C. In almost preferred embodiment, the conventional-type transition metal catalyst and/or the bulky ligand metallocene catalyst are supported on a carrier.

In another embodiment, the steps of the method of the invention include forming a polymerization catalyst, preferably forming a supported polymerization catalyst, heating the polymerization catalyst or the supported polymerization catalyst, and then contacting the polymerization catalyst or supported polymerization catalyst with a carboxylate metal salt. In a preferred method, the polymerization catalyst comprises a catalyst compound, an activator or cocatalyst and a carrier, preferably the polymerization catalyst is a supported bulky ligand metallocene catalyst.

In one embodiment of the method of the invention the carboxylate metal salt is contacted with the catalyst system, preferably a supported catalyst system, most preferably a supported bulky ligand metallocene catalyst system, wherein the catalyst system is at a temperature in the range of from 30° C. to about 200° C., preferably from 40° C. to about 150° C., more preferably from about 50° C. to about 120° C., and most preferably from about 60° C. to about 100° C.

In a preferred embodiment, the contacting of the heated polymerization catalyst or catalyst system (above room temperature) with a carboxylate metal salt is performed under an inert gaseous atmosphere, such as nitrogen. However, it is contemplated that the combination of the heated polymerization catalyst and the carboxylate metal salt may be performed in the presence of olefin(s), solvents, hydrogen and the like.

In one embodiment of the method of the invention, the heated polymerization catalyst or catalyst system and the carboxylate metal salt is combined in the presence of a liquid, for example the liquid may be a mineral oil, toluene, hexane, isobutane or a mixture thereof. In a more preferred method a carboxylate metal salt is combined with a heated polymerization catalyst that has been formed in a liquid, preferably in a slurry, or combined with a substantially dry or dried, polymerization catalyst that has been placed in a liquid and reslurried.

In an embodiment, the contact time for the carboxylate metal salt and the heated polymerization catalyst may vary depending on one or more of the conditions, temperature and pressure, the type of mixing apparatus, the quantities of the components to be combined, and even the mechanism for introducing the polymerization catalyst/carboxylate metal salt combination into the reactor.

Preferably, a heated polymerization catalyst, preferably a heated bulky ligand metallocene catalyst compound and a carrier, is contacted with a carboxylate metal salt for a period of time from about a second to about 24 hours, preferably from about 1 minute to about 12 hours, more preferably from about 10 minutes to about 10 hours, and most preferably from about 30 minutes to about 8 hours.

Preferably, a heated polymerization catalyst, preferably a heated bulky ligand metallocene catalyst compound, the activator and the carrier, are contacted with a carboxylate metal salt for a period of time from about a second to about 24 hours, preferably from about 1 minute to about 12 hours, more preferably from about 10 minutes to about 10 hours, and most preferably from about 30 minutes to about 8 hours.

In an embodiment, the ratio of the weight of the carboxylate metal salt to the weight of the transition metal of the catalyst compound is in the range of from about 0.01 to about 1000, preferably in the range of from 1 to about 100, more preferably in the range of from about 2 to about 50, and most preferably in the range of from 4 to about 20. In one embodiment, the ratio of the weight of the carboxylate metal salt to the weight of the transition metal of the catalyst compound is in the range of from about 2 to about 20, more preferably in the range of from about 2 to about 12, and most preferably in the range of from 4 to about 10.

In another embodiment of the method of the invention, the weight percent of the carboxylate metal salt based on the total weight of the polymerization catalyst is in the range of from about 0.5 weight percent to about 50 weight percent, preferably in the range of from 1 weight percent to about 25 weight percent, more preferably in the range of from about 2 weight percent to about 12 weight percent, and most preferably in the range of from about 2 weight percent to about 10 weight percent. In another embodiment, the weight percent of the carboxylate metal salt based on the total weight of the polymerization catalyst is in the range of from 1 to about 50 weight percent, preferably in the range of from 2 weight percent to about 30 weight percent, and most preferably in the range of from about 2 weight percent to about 20 weight percent.

If the polymerization catalyst includes a carrier, the total weight of the polymerization catalyst includes the weight of the carrier.

It is preferred that for densities lower than 0.910 g/cc more carboxylate metal salt is combined with the heated polymerization catalyst.

It is believed that the more metal of the activator, for example total aluminum content or free aluminum content (the alkyl aluminum content in alumoxane), present in the polymerization catalyst, the more carboxylate metal salt is required. Manipulating the amounts or loadings of the polymerization catalyst components, i.e. the free aluminum may provide a means for adjusting the level of carboxylate metal salt.

Mixing techniques and equipment contemplated for use in the method of the invention are well known. Mixing techniques may involve any mechanical mixing means, for example shaking, stirring, tumbling, and rolling. Another technique contemplated involves the use of fluidization, for example in a fluid bed reactor vessel where circulated gases provide the mixing. Non-limiting examples of mixing equipment include a ribbon blender, a static mixer, a double cone blender, a drum tumbler, a drum roller, a dehydrator, a fluidized bed, a helical mixer and a conical screw mixer.

In a preferred embodiment of the invention the catalyst system of the invention is supported on a carrier, preferably the supported catalyst system is substantially dried, preformed, substantially dry and/or free flowing. In an especially preferred method of the invention, the preformed supported catalyst system is heated to a temperature in the range of from 30° C. to 100° C. and contacted at around this temperature with a carboxylate metal salt. The carboxylate metal salt may be in solution or slurry or in a dry state, preferably the carboxylate metal salt is in a substantially dry or dried state. In the most preferred embodiment, the carboxylate metal salt is contacted with a heated supported catalyst system, preferably a heated supported bulky ligand metallocene catalyst system, in a rotary mixer under a nitrogen atmosphere, most preferably the mixer is a tumble mixer, or in a fluidized bed mixing process, in which the polymerization catalyst and the carboxylate metal salt are in a solid state, that is they are both substantially in a dry state or in a dried state.

There are various other methods in the art for supporting a polymerization catalyst compound or catalyst system of the invention. For example, the bulky ligand metallocene catalyst compound may contain a polymer bound ligand as described in U.S. Pat. Nos. 5,473,202 and 5,770,755, which is herein fully incorporated by reference; the bulky ligand metallocene catalyst system may be spray dried as described in U.S. Pat. No. 5,648,310, which is herein fully incorporated by reference; the support used with the bulky ligand metallocene catalyst system of the invention is functionalized as described in European publication EP-A-0 802 203, which is herein fully incorporated by reference, or at least one substituent or leaving group is selected as described in U.S. Pat. No. 5,688,880, which is herein fully incorporated by reference.

In a preferred embodiment, the invention provides for a supported bulky ligand metallocene catalyst system that includes a surface modifier that is used in the preparation of the supported catalyst system as described in PCT publication WO 96/11960, which is herein fully incorporated by reference. The catalyst systems of the invention can be prepared in the presence of an olefin, for example hexene-1.

A preferred method for producing a supported bulky ligand metallocene catalyst system is described below and is described in U.S. application Ser. No. 265,533, filed Jun. 24, 1994 and Ser. No. 265,532, filed Jun. 24, 1994 and PCT publications WO 96/00245 and WO 96/00243 both published Jan. 4, 1996, all of which are herein fully incorporated by reference. In this preferred method, the bulky ligand metallocene catalyst compound is slurried in a liquid to form a metallocene solution and a separate solution is formed containing an activator and a liquid. The liquid may be any compatible solvent or other liquid capable of forming a solution or the like with the bulky ligand metallocene catalyst compounds and/or activator of the invention. In the most preferred embodiment the liquid is a cyclic aliphatic or aromatic hydrocarbon, most preferably toluene. The bulky ligand metallocene catalyst compound and activator solutions are mixed together heated and added to a porous support, optionally a heated porous support, or a porous support, optionally a heated porous support is added to the solutions such that the total volume of the bulky ligand metallocene catalyst compound solution and the activator solution or the bulky ligand metallocene catalyst compound and activator solution is less than four times the pore volume of the porous support, more preferably less than three times, even more preferably less than two times; preferred ranges being from 1.1 times to 3.5 times range and most preferably in the 1.2 to 3 times range.

Procedures for measuring the total pore volume of a porous support are well known in the art. Details of one of these procedures is discussed in Volume 1, *Experimental Methods in Catalytic Research* (Academic Press, 1968) (specifically see pages 67–96). This preferred procedure involves the use of a classical BET apparatus for nitrogen absorption. Another method well known in the art is described in Innes, *Total Porosity and Particle Density of Fluid Catalysts By Liquid Titration*, Vol. 28, No. 3, Analytical Chemistry 332–334 (March, 1956).

The mole ratio of the metal of the activator component to the metal of the supported bulky ligand metallocene catalyst compounds are in the range of between 0.3:1 to 1000:1, preferably 20:1 to 800:1, and most preferably 50:1 to 500:1. Where the activator is an ionizing activator such as those based on the anion tetrakis(pentafluorophenyl)boron, the mole ratio of the metal of the activator component to the metal component of the bulky ligand metallocene catalyst is preferably in the range of between 0.3:1 to 3:1.

In one embodiment of the invention, olefin(s), preferably $C_2$ to $C_{30}$ olefin(s) or alpha-olefin(s), preferably ethylene or propylene or combinations thereof are prepolymerized in the presence of the a bulky ligand metallocene catalyst system of the invention prior to the main polymerization. The prepolymerization can be carried out batchwise or continuously in gas, solution or slurry phase including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

In an embodiment, the method of the invention provides for co-injecting into a reactor, an unsupported polymerization catalyst that is first heated to a temperature greater than room temperature, and then combined with a carboxylate metal. In one embodiment the polymerization catalyst is used in an unsupported form, preferably in a liquid form such as described in U.S. Pat. Nos. 5,317,036 and 5,693,727 and European publication EP-A-0 593 083, all of which are herein incorporated by reference. The heated polymerization catalyst in liquid form can be fed with a carboxylate metal salt, as a solid or a liquid, to a reactor using the injection methods described in PCT publication WO 97/46599, which is fully incorporated herein by reference.

In one embodiment, the supported catalyst system containing a carboxylate metal salt, preferably the supported bulky ligand metallocene-type catalyst system containing a carboxlate metal salt have a average flow time less than 150 seconds, preferably less than 100 seconds, more preferably less than 75 seconds, even more preferably less than 50 seconds, still even more preferably less than 40 seconds, and most preferably less than 20 seconds.

Where a carboxylate metal salt and a heated unsupported bulky ligand metallocene catalyst system combination is utilized, the mole ratio of the metal of the activator component to the metal of the bulky ligand metallocene catalyst compound is in the range of between 0.3:1 to 10,000:1, preferably 100:1 to 5000:1, and most preferably 500:1 to 2000:1.

Polymerization Process

The supported catalyst systems and/or compositions of the invention described above are suitable for use in any prepolymerization and/or polymerization process over a wide range of temperatures and pressures. The temperatures may be in the range of from −60° C. to about 280° C., preferably from 50° C. to about 200° C., and the pressures employed may be in the range from 1 atmosphere to about 500 atmospheres or higher.

Polymerization processes include solution, gas phase, slurry phase and a high pressure process or a combination thereof. Particularly preferred is a gas phase or slurry phase polymerization of one or more olefins at least one of which is ethylene or propylene.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene.

In the most preferred embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process. In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms. Polypropylene polymers may be produced using the particularly bridged bulky ligand metallocene catalysts as described in U.S. Pat. Nos. 5,296,434 and 5,278,264, both of which are herein incorporated by reference.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228, all of which are fully incorporated herein by reference.)

The reactor pressure in a gas phase process may vary from about 100 psig (690 kPa) to about 500 psig (3448 kPa), preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In a preferred embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300

Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A preferred polymerization technique of the invention is referred to as a particle form polymerization, or a slurry process where the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555 and PCT WO 99/32525, which are fully incorporated herein by reference.

A preferred process of the invention is where the process, preferably a slurry or gas phase process is operated in the presence of a bulky ligand metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This preferred process is described in PCT publication WO 96/08520 and U.S. Pat. Nos. 5,712,352 and 5,763,543, which are herein fully incorporated by reference.

Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, polypropylene and polypropylene copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

The polymers produced by the process of the invention typically have a molecular weight distribution, a weight average molecular weight to number average molecular weight ($M_w/M_n$) of greater than 1.5 to about 15, particularly greater than 2 to about 10, more preferably greater than about 2.2 to less than about 8, and most preferably from 2.5 to 8.

Also, the polymers of the invention typically have a narrow composition distribution as measured by Composition Distribution Breadth Index (CDBI). Further details of determining the CDBI of a copolymer are known to those skilled in the art. See, for example, PCT Patent Application WO 93/03093, published Feb. 18, 1993, which is fully incorporated herein by reference.

The bulky ligand metallocene catalyzed polymers of the invention in one embodiment have CDBI's generally in the range of greater than 50% to 100%, preferably 99%, preferably in the range of 55% to 85%, and more preferably 60% to 80%, even more preferably greater than 60%, still even more preferably greater than 65%.

In another embodiment, polymers produced using a bulky ligand metallocene catalyst system of the invention have a CDBI less than 50%, more preferably less than 40%, and most preferably less than 30%.

The polymers of the present invention in one embodiment have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min.

The polymers of the invention in an embodiment have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio ($I_{21}/I_2$) ($I_{21}$ is measured by ASTM-D-1238-F) of from preferably greater than 25, more preferably greater than 30, even more preferably greater that 40, still even more preferably greater than 50 and most preferably greater than 65. In an embodiment, the polymer of the invention may have a narrow molecular weight distribution and a broad composition distribution or vice-versa, and may be those polymers described in U.S. Pat. No. 5,798,427 incorporated herein by reference.

In yet another embodiment, propylene based polymers are produced in the process of the invention. These polymers include atactic polypropylene, isotactic polypropylene, hemi-isotactic and syndiotactic polypropylene. Other propylene polymers include propylene block or impact copolymers. Propylene polymers of these types are well known in the art see for example U.S. Pat. Nos. 4,794,096, 3,248,455, 4,376,851, 5,036,034 and 5,459,117, all of which are herein incorporated by reference.

The polymers of the invention may be blended and/or coextruded with any other polymer. Non-limiting examples of other polymers include linear low density polyethylenes produced via conventional Ziegler-Natta and/or bulky ligand metallocene catalysis, elastomers, plastomers, high pressure low density polyethylene, high density polyethylenes, polypropylenes and the like.

Polymers produced by the process of the invention and blends thereof are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

In order to provide a better understanding of the present invention including representative advantages thereof, the following examples are offered.

COMPARATIVE EXAMPLE 1

Witco Aluminum Stearate #22 (AlSt #22) [$CH_3(CH_2)_{16}COO]_2Al$—OH available from Witco Corporation, Memphis, Tenn. was used. This is also the carboxylate metal salt used in the examples below. The untapped bulk density, and sieve flow characteristics of this sample were measured and recorded in Table 1.

EXAMPLE 2

Sieving Test Used for Measuring Flow Properties

The following procedure outlines the steps followed to measure catalyst flowability using the ATM Sonic Sifter. The test was used to compare the various catalyst compositions by measuring the time it takes for a 2.0 gram sample to pass through a selected sieve size. The preferred sieve size is 18 mesh or 1,000 microns. The sonic sifter was used as a tapping device only with the amplitude for sifting mechanism set to zero. Because the catalyst samples tested are air and moisture sensitive, it is necessary to perform the test under anaerobic conditions. The steps were as follows:
1) Two grams of the catalyst sample to be measured is weighed into plastic boat with pour spout.
2) The 18 mesh sieve is placed on the fines collection device and a plastic powder funnel with a 17 mm opening is placed on the top of the sieve.
3) The 2.0 gram catalyst sample is poured down the slope of the funnel.
4) The funnel is slowly lifted and the catalyst sample is allowed to spread out on the top of the sieve.
5) The five spacers are carefully placed above the 18 mesh screen and the stack is locked together.
6) The assembly (screen and spacers) is placed inside of the test chamber of the sonic sifter.
7) The arms holding the stack together are unlocked so that the springs in the top of the assembly will operate freely.
8) The amplitude setting is checked to make sure it is set to zero. The tapping function (one tap every 4 sec) only will be employed.
9) The stopwatch is started when the first tap is observed.
10) The stopwatch is stopped when the entire sample has passed through the sieve.
11) The sonic sifter timer is then turned off.
12) The stopwatch time is recorded in the lab notebook and the procedure repeated.

EXAMPLE 3

Funnel Test Used for Measuring Flow Properties

The following procedure outlines the steps followed to measure catalyst flowability using the funnel test. Because the catalyst samples tested are air and moisture sensitive, it is necessary to perform the test under anaerobic conditions. The funnel sizes used are 14, 12, 10 and 5 mm opening. The steps were as follows:
1) Twenty grams of the catalyst sample to be measured is weighed into 14 mm funnel with bottom covered.
2) The stopwatch is started when the bottom cover is removed.
3) The stopwatch is stopped when the entire sample has passed through.
4) The stopwatch time is recorded in the lab notebook and the procedure repeated using a smaller size funnel. If catalyst doesn't flow through certain size funnel, there are no further tests using smaller size funnel.

EXAMPLE 4

Preparation of a Supported Unbridged Bulky Ligand Metallocene Catalyst System

Into a 2 gallon (7.57 liters) reactor was charged first with 2.0 liters of toluene then, 1060 g of 30 wt % methylalumoxane solution in toluene (available from Albemarle, Baton Rouge, La.), followed by 23.1 g of bis(1,3-methyl-n-butyl cyclopentadienyl) zirconium dichloride as a 10% solution in toluene. The mixture was stirred for 60 minutes at room temperature after which 850 g of silica (Davison 948 dehydrated at 600° C. available from W. R. Grace, Davison Chemical Division, Baltimore, Md.) was added to the liquid with slow agitation. Stirring speed was increased for approximately 10 minutes to insure dispersion of the silica into the liquid and then appropriate amount of toluene was added to make up a slurry of liquid to solid having a consistency of 4 cc/g of silica. Mixing was continued for 15 minutes at 120 rpm after which 6 g of Kemamine AS-990 (available Witco Corporation, Memphis, Tenn.) was dissolved in 100 cc of toluene and was added and stirred for 15 minutes. Drying was then initiated by vacuum and some nitrogen purge at 175° F. (79.4° C.). When the polymerization catalyst comprising the carrier, silica, appeared to be free flowing, it was cooled down and discharged into a nitrogen purged vessel. An approximate yield of 1 Kg of dry polymerization catalyst was obtained due to some loses due to drying.

COMPARATIVE EXAMPLE 5

Blending with Supported Catalyst System

Supported unbridged metallocene catalyst with good flowability was blended as described above with 4 weight percent carboxylate metal salt at room temperature. 15 lb (6.8 kg) good flow supported catalyst was charged to the 45L Jaygo Conical Screw Blender at room temperature. 0.6 lb (0.273 kg) (4 wt %) carboxylate metal salt was then added on top of the supported catalyst. The blending was then started with 20 RPM screw speed and 1 RPM auger speed. Samples were taken at 10, 15, and 30 minutes from the bottom discharge line by stopping screw and auger. Samples were then tested for flowability using test described in Examples 2 and 3 (BS-4).

COMPARATIVE EXAMPLE 6
Blending with Supported Catalyst System

Example 6 is similar to Example 5 except that nitrogen bubbling was used. 15 lb (6.8 kg) good flow supported catalyst was charged to the 45L Jaygo Conical Screw Blender at room temperature. 0.6 lb (0.272 kg) (4 wt %) carboxylate metal salt was then added on top of the supported catalyst. A nitrogen flow was then started through the bottom discharge line. Nitrogen flow was regulated to created some bubbling in the catalyst bed. The blending was then started with 20 RPM screw speed and 1 RPM auger speed. Samples were taken at 10, 15, and 30 minutes from the bottom discharge line by stopping screw and auger. Samples were then tested for flowability using test described in Examples 2 and 3 (BS-5).

EXAMPLE 7
Blending with Supported Catalyst System

Example 7 is similar to Example 5 except that 3 weight percent instead of 4 weight percent carboxylate metal salt was used. 15 lb (6.8 kg) good flow supported catalyst was charged to the 45L Jaygo Conical Screw Blender at room temperature. 0.45 lb (0.204 kg) (3 wt %) carboxylate metal salt was then added on top of the supported catalyst. The blending was then started with 20 RPM screw speed and 1 RPM auger speed. Samples were taken at 4, 15, and 30 minutes from the bottom discharge line by stopping screw and auger. Samples were then tested for flowability using test described in Examples 2 and 3 (BS-11A).

EXAMPLE 8
Blending with Supported Catalyst System

Example 8 is similar to Example 7 except that different batches of carboxylate metal salt and bare supported catalyst were used. 15 lb (6.8 kg) good flow supported catalyst was charged to the 45L Jaygo Conical Screw Blender at room temperature. 0.45 lb (0.204 kg) (3 wt %) carboxylate metal salt was then added on top of the supported catalyst. A nitrogen flow was then started through the bottom discharge line. The blending was then started with 20 RPM screw speed and 1 RPM auger speed. Samples were taken at 4, 15, and 30 minutes from the bottom discharge line by stopping screw and auger. Samples were then tested for flowability using test described in Examples 2 and 3 (BS-13).

EXAMPLE 9
Blending with Supported Catalyst System

Example 9 is a high temperature blending test with supported unbridged metallocene catalyst. The 45L Jaygo Conical Screw Blender was first heated to 175° F. (79.4° C.) jacket temperature. 15 lb (6.8 kg) good flow supported catalyst was then charged to the Jaygo Blender and was heated for 1 hour at 20 RPM screw speed and 1 RPM auger speed. After 1 hour of heating, 0.60 lb (0.272 kg) (4 wt %) carboxylate metal salt was then added on top of the supported catalyst. The blending was then started with 20 RPM screw speed and 1 RPM auger speed. Samples were taken at 4 and 15 minutes from the bottom discharge line by stopping screw and auger. The screw was stopped after 15 minutes blending and blender content was statically heated up to 24 hours. Samples were taken at 4, 18 and 24 hours static heating to test the effects of static heating on catalyst flowability. Samples were then tested for flowability using test described in Examples 2 and 3 (BS-18).

EXAMPLE 10
Blending with Supported Catalyst System

Example 10 is also a high temperature blending test similar to Example 9 except that the total blending time was 30 minutes and there was no static heating after blending. The 45L Jaygo Conical Screw Blender was first heated to 175° F. (79.4° C.) jacket temperature. 15 lb (6.8 kg) good flow supported catalyst was charged to the Jaygo Blender and was heat for 1 hour at 20 RPM screw speed and 1 RPM auger speed. After 1 hour of heating, 0.60 lb (0.272 kg) (4 wt %) carboxylate metal salt was then added on top of the supported catalyst. The blending was then started with 20 RPM screw speed and 1 RPM auger speed. Samples were taken at 4, 15, and 30 minutes from the bottom discharge line by stopping screw and auger. Samples were then tested for flowability using test described in Examples 2 and 3 (BS-19).

EXAMPLE 11
Blending with Supported Catalyst System

Example 11 is also a high temperature blending test similar to Example 9 except that a bridged supported metallocene catalyst was used. The 45L Jaygo Conical Screw Blender was first heated to 175° F. (79.4° C.) jacket temperature. 15 lb (6.8 kg) good flow supported bridged catalyst was charged to the Jaygo Blender and was heated for 1 hour at 20 RPM screw speed and 1 RPM auger speed. After 1 hour of heating, 0.60 lb (0.272 kg) (4 wt %) carboxylate metal salt was then added on top of the supported catalyst. The blending was then started with 20 RPM screw speed and 1 RPM auger speed. Samples were taken at 4, 15, and 30 minutes from the bottom discharge line by stopping screw and auger. Samples were then tested for flowability using test described in Examples 2 and 3 (BS-21).

TABLE 1

Flowability at 4% Carboxylate Metal Salt at Normal and High Temperature Mixing

| Examples | Temp | Blending Time (min) | Flow-ability | 14 mm (sec) | 12 mm (sec) | 10 mm (sec) | 7 mm (sec) | 5 mm (sec) | sieve (sec) |
|---|---|---|---|---|---|---|---|---|---|
| CEX 5 | Room | 10 | Poor | NF | NF | NF | NF | NF | 94 |
|  |  | 15 | Poor | NF | NF | NF | NF | NF | 90 |
|  |  | 30 | Poor | NF | NF | NF | NF | NF | 142 |
| CEX 6 | Room | 5 | Poor | NF | NF | NF | NF | NF | 86 |
|  |  | 15 | Poor | NF | NF | NF | NF | NF | 88 |
|  |  | 30 | Poor | NF | NF | NF | NF | NF | 110 |
| EX 9 | High (175° F.) | 4 | Good | 2.0 | 5.0 | 9.0 | NF | NF | 52 |
|  |  | 5 | Good | 2.0 | 5.0 | 12.0 | NF | NF | 74 |
|  |  | 4 hr (heating) | Good | 3.3 | 4.0 | 10.5 | NF | NF | 60 |

TABLE 1-continued

Flowability at 4% Carboxylate Metal Salt at Normal and High Temperature Mixing

| Examples | Temp | Blending Time (min) | Flow-ability | 14 mm (sec) | 12 mm (sec) | 10 mm (sec) | 7 mm (sec) | 5 mm (sec) | sieve (sec) |
|---|---|---|---|---|---|---|---|---|---|
| EX 10 | High (175° F.) | 4 | Good | 1.4 | 2.0 | 5.5 | 40.0 | 133.0 | 31 |
|  |  | 15 | Good/Fair | 4.0 | 5.2 | 13.5/NF | NF | NF | 69 |
|  |  | 30 | Fair | 2.4 | 7.0/1T | NF | NF | NF | 76 |
| EX 11 | High (175° F.) | 4 | Good | 1.7 | 2.2 | 3.0 | 72.3 | 245(1T) |  |
|  |  | 15 | Good | 1.5 | 2.5 | 5.0 | NF | NF |  |
|  |  | 30a | Good/Fair | 2.4 | 7.7(1T) | NF | NF | NF |  |
|  |  | 30b | Good/Fair | 1.9 | 3.0 | NF | NF | NF |  |

NF means no flow.
Good: good flow catalyst, pass all three funnels (14, 12, 10 mm)
Fair: fair flow catalyst, pass one or two funnels (14, 12, 10 mm)
Poor: poor flow catalyst, fail all three funnels (14, 12, 10 mm)

TABLE 2

Flowability at 4% Carboxylate Metal Salt at High Temperature and 3% Carboxylate Metal Salt Control

| Examples | Temp | Blending Time (min) | Flow-ability | 14 mm (sec) | 12 mm (sec) | 10 mm (sec) | 7 mm (sec) | 5 mm (sec) | sieve (sec) |
|---|---|---|---|---|---|---|---|---|---|
| EX 7 | Room | 4 | Good | 3.0 | 4.0 | 10.0 | NF | NF | 60 |
|  |  | 15 | Fair | 4.0 | 8.0 | NF | NF | NF | 82 |
|  |  | 30 | Poor | NF | NF | NF | NF | NF | 138 |
| EX 8 | Room | 4 | Good | 4.0 | 6.0 | 13.0 | NF | NF | 54 |
|  |  | 15 | Fair/Poor | 4.0 | NF | NF | NF | NF | 67 |
|  |  | 30 | Poor | NF | NF | NF | NF | NF | 115 |
| EX 9 | High (175 F.) | 4 | Good | 2.0 | 5.0 | 9.0 | NF | NF | 52 |
|  |  | 15 | Good | 2.0 | 5.0 | 12.0 | NF | NF | 74 |
|  |  | 4 hr (static) | Good | 3.3 | 4.0 | 10.5 | NF | NF | 60 |
| EX 10 | High (175 F.) | 4 | Good | 1.4 | 2.0 | 5.5 | 40.0 | 133.0 | 31 |
|  |  | 15 | Good/Fair | 4.0 | 5.2 | 13.5/NF | NF | NF | 69 |
|  |  | 30a | Fair | 2.4 | 7.0/1T | NF | NF | NF | 76 |
|  |  | 30b | Poor | NF | NF | NF | NF | NF | 67 |

Good: good flow catalyst, pass all three funnels (14, 12, 10 mm)
Fair: fair flow catalyst, pass one or two funnels (14, 12, 10 mm)
Poor: poor flow catalyst, fail all three funnels (14, 12, 10 mm)

While the present invention has been described and illustrated by reference to particular embodiments, those of ordinary skill in the art will appreciate that the invention lends itself to variations not necessarily illustrated herein. For example, it is contemplated that two or more supported catalyst compositions of the invention can be used. For this reason, then, reference should be made solely to the appended claims for purposes of determining the true scope of the present invention.

We claim:

1. A method for making a catalyst composition, the method comprising the steps of:
   (a) heating a polymerization catalyst to a temperature greater than 30° C. to form a heated polymerization catalyst; and
   (b) combining the heated polymerization catalyst with a carboxylate metal salt.

2. The method of claim 1 wherein the polymerization catalyst comprises a bulky ligand metallocene catalyst compound.

3. The method of claim 1 wherein the carboxylate metal salt is represented by the formula:

$$MQ_x(OOCR)_y$$

where M is a metal from the Periodic Table of Elements; Q is halogen, or hydroxy, alkyl, alkoxy, aryloxy, siloxy, silane or sulfonate group; R is a hydrocarbyl radical having from 2 to 100 carbon atoms; x is an integer from 0 to 3; y is an integer from 1 to 4; the sum of x and y is equal to the valence of the metal M; Q is halogen or a hydroxy group; and R is a hydrocarbyl radical having from 4 to 24 carbon atoms.

4. The method of claim 1 wherein the temperature is greater than 50° C.

5. The method of claim 1 wherein the temperature is in the range of from 60° C. to 100° C.

6. A continuous process for polymerizing olefin monomer (s) in a reactor under polymerization conditions, the process comprising the steps of:
   (a) introducing olefin monomer(s) to the reactor;
   (b) heating a polymerization catalyst to a temperature greater than room temperature;
   (b) adding a carboxylate metal salt to the heated polymerization catalyst to form a catalyst composition;
   (c) introducing the catalyst composition to the reactor; and
   (d) withdrawing a polymer product from the reactor.

7. The process of claim 6 wherein in step (b) the temperature is greater than 50 C.

8. The process of claim 6 wherein the amount of carboxylate metal salt is greater than 3.5 weight percent based on the total weight percent of the polymerization catalyst.

9. The process of claim 8 wherein the in step (b) the temperature is in the range of from 60° C. to 100° C.

10. The process of claim 6 wherein the carboxylate metal salt is stearate compound.

11. The process of claim 10 wherein the carboxylate salt is used in an amount equal to or greater than 4 weight percent based on the total weight of the polymerization catalyst.

* * * * *